United States Patent
Savit

[15] 3,662,325
[45] May 9, 1972

[54] METHOD OF DISPLAYING SEISMIC DATA

[72] Inventor: Carl H. Savit, Houston, Tex.

[73] Assignee: Western Geophysical Company of America, Houston, Tex.

[22] Filed: Aug. 27, 1969

[21] Appl. No.: 853,467

[52] U.S. Cl. .................. 340/15.5 DS, 340/15.5 AC, 346/46
[51] Int. Cl. ............................................................ G01v 1/34
[58] Field of Search ............ 340/15.5 DS, 15.5 BH, 15.5 AC; 346/46; 353/31; 35/10

[56] References Cited

UNITED STATES PATENTS

| | | | |
|---|---|---|---|
| 3,180,141 | 4/1965 | Alger | 340/15.5 |
| 3,208,549 | 9/1965 | Alexander et al. | 340/15.5 |
| 2,615,778 | 10/1952 | Butz | 346/46 |
| 3,401,400 | 9/1968 | Lindsey | 340/15.5 |
| 2,200,476 | 5/1940 | Mounce | 340/15.5 |
| 3,390,377 | 6/1968 | Elliot et al. | 340/15.5 |
| 3,067,931 | 12/1962 | Mosse | 346/17 |
| 3,268,858 | 8/1966 | Winter | 340/15.5 |

OTHER PUBLICATIONS

Ivanhoe, Conversion of Electric Logs for Seismic Time Sections, 30 Geophysics 1,141– 1143 (1965)

*Primary Examiner*—Malcolm F. Hubler
*Attorney*—Michael P. Breston, Alan C. Rose and Alfred B. Levine

[57] ABSTRACT

This invention is concerned with displays of characteristics which are intrinsic properties of subterranean formations. They include acoustic velocity, acoustic attenuation, Poisson's ratio, acoustic impedance, elasticity (bulk modulus), density, velocity and attenuation of shear waves, etc. The intrinsic properties themselves are typically obtained and processed from the seismic data provided by conventional or modified seismic CDP or other observations.

23 Claims, 3 Drawing Figures

METHOD OF DISPLAYING SEISMIC DATA

BACKGROUND OF THE INVENTION

A seismic prospecting method which is generally employed is known as "common-depth-point" (CDP) method. It is based on successively initiating seismic disturbances at a plurality of locations near the surface of the earth or in water and determining the time intervals for the resulting seismic waves to travel from the points of the seismic disturbances to a plurality of suitably spaced detection stations. The waves which reach the transducers at the detection stations are waves which are reflected from discontinuities in the earth's structure, i.e., from various substrata and the like.

The transducers detect the reflected acoustic or seismic waves and convert them into corresponding alternating electric signals having amplitude and frequency variations, herein called "amplitude data." Also employed are accurate time measuring devices which measure the time intervals between the initiation of the seismic disturbance and the arrival times of the seismic waves at the detector locations. From such amplitude data and other data it is possible to calculate the depths to the various substrata.

Consequently, the CDP method of seismic observation determines the amplitude (relative or absolute) of reflected seismic waves which are received at specific detection stations. The amplitude data from such seismic observations is recorded in a side-by-side relationship on a suitable record medium which may be paper, film, etc. Such a record medium provides a seismogram or a record section, both herein called a "stacked amplitude display" (SAD). A SAD is prepared as a two-dimensional data field depicting amplitude intensity as a function of horizontal and vertical dimensions. The horizontal dimension is usually horizontal distance over the earth, and the vertical dimension is alternatively vertical travel time or depth.

The SAD is commonly depicted as variations of black-and-white areas in vertical bands or traces, the various modes of display being commonly known as variable area, variable density, or variable amplitude. Sometimes two such modes are superimposed on the same trace. Methods have also been proposed to depict such traces in color. U.S. Pat. No. 3,193,838, for example, describes such a method.

The SAD may consist of a hundred or several hundred traces or bands. Each trace may represent seismic data from a plurality of seismic observations. Each observation typically provides recordings from 24 or more detector stations. The SAD may represent an analyst's interpretation of the processed original seismic data or the processed seismic data itself. The extent and accuracy of the information derived from SAD is to a very great extent dependent on previous knowledge of the identity of the particular rock types corresponding to the amplitude data represented by the SAD. A knowledge of the acoustic or seismic velocity and/or attenuation of particular strata is generally adequate to permit identification of those strata with specific rock types.

Seismic velocity is sometimes obtainable from well-logging operations, from theoretical and/or experimental operations, or from the processing of CDP seismic signals which represent the seismic waves. In general, seismic waves include among others P-waves (known as primary, pressure, or acoustic waves), shear waves or transverse waves, boundary waves, such as Stonley waves, Rayleigh waves, etc. Each wave-type has a characteristic velocity. The waves which are of greatest interest are the P-waves. Thus this invention is described in terms of the characteristic velocity and attenuation of P-waves. The invention however is not limited to particular types of intrinsic characteristics of rocks but is equally applicable to velocity or attenuation of other waves or to other measurable or determinable properties of subterranean rocks.

In sum, the SAD is concerned primarily with depicting the amplitude and/or frequency variations of processed seismic data. From the SAD an analyst may gain information concerning the shape or configuration of the substrata. This is due to the fact that the SAD is the depiction of essentially extrinsic characteristics of the individual substrata rocks, or beds and depends only incidentally on the specific physical characteristics of those strata.

SUMMARY OF THE INVENTION

This invention is primarily concerned with displays of characteristics which are intrinsic properties of subterranean formations. They include acoustic velocity, acoustic attenuation, Poisson's ratio, acoustic impedance, elasticity (bulk modulus), density, velocity and attenuation of shear waves, etc. The intrinsic properties themselves are typically obtained and processed from the seismic data provided by conventional or modified seismic CDP or other observations.

This invention provides stacked, characteristic displays (SCD) either alone or in combination of the same surface with a SAD. Thus, in accordance with this invention a display may depict on one surface: only one intrinsic characteristic, such as velocity, a plurality of intrinsic characteristics, or one or more of intrinsic and of extrinsic characteristics.

The depictions or displays may be in black and white. For greater differentiation of data, however, they should preferably be in color.

Various apparatus and techniques for carrying out the method of this invention are known and commercially available. They may include analog or digital cathode-ray tube plotters, oscillographic recorders, photographic cameras with variable color filters, electrostatic recorders, etc.

Accordingly, this invention provides a new SCD which greatly simplifies and accelerates the interpretation process of a conventional SAD and which allows the interpreter to easily gain information relating both to the shape and to the identity of the substrata.

BRIEF DESCRIPTION OF THE DRAWINGS

Referring to FIG. 1, there is shown a plurality of subsurface formations 10, a "shot point" 12 and a plurality of seismic transducers 14. The transducers 14 translate the reflected acoustic waves resulting from the seismic disturbance at the shot point 12 into a plurality of electric signals having distinct amplitude and frequency variations. A cable 16 couples the outputs of transducers 14 to a suitable analog-to-digital converter and multiplexer system 18 which stores the seismic amplitude data on a recording medium (not shown) by means of a recording system 20. The recording medium is read by a digital computer 22 which is suitably programmed by a programmer 24 to provide one or more desired intrinsic characteristics of the substrata.

Figure 1:
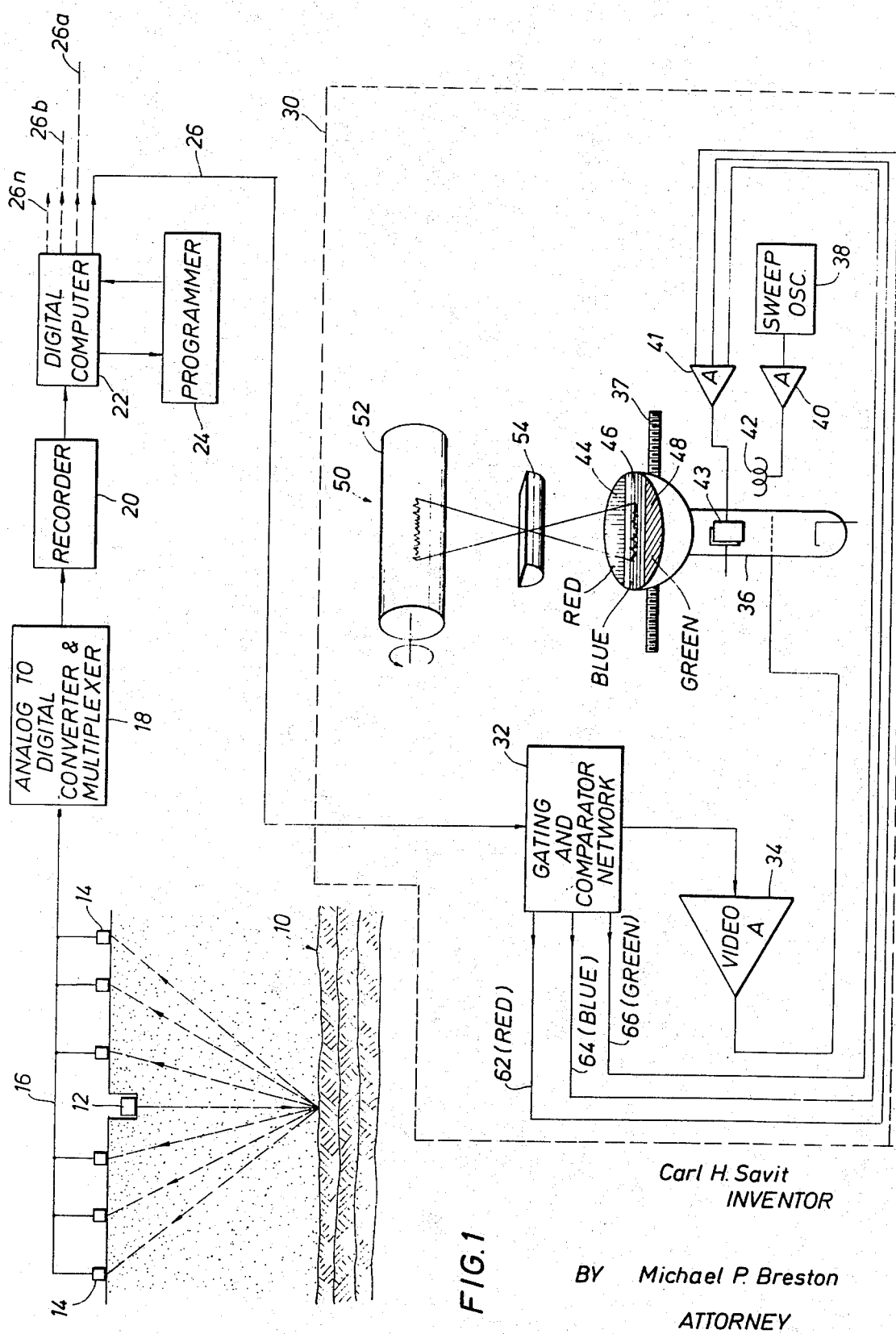
FIG. 1 is a schematic diagram of an apparatus for carrying the method of this invention.

In the common-depth-point (CDP) method of seismic reflection surveying, several independent recordings are obtained from any one subsurface reflecting point. After all the recordings from one point have been corrected for normal moveout, the results are added or composited. Each selected value of normal moveout corresponds to a given value of seismic velocity.

One graphic method for selecting proper normal moveouts (and thus determining velocity) is to stack the same set of CDP data using each of several velocities and then to examine the results. In a velocity analysis program, the computer 22 goes through a quite similar procedure. It compares the members of a common-depth-point family at each of many velocities or normal moveouts. Instead of adding the traces, however, it may crosscorrelate them. Crosscorrelation is a more sensitive way to compare traces than is addition, so the program crosscorrelates all possible pairs of traces of each common-depth family, over many successive time intervals, and for each of many velocities. The values of velocity for which the crosscorrelation of traces are maximum are the velocities at which the reflected energy traveled from source to receiver.

In any event, the digital computer 22 provides on line 26 the desired intrinsic characteristic signal (ICS) which preferably is in a form which has amplitude variations with respect to time. The ICS can be any desired time-varying signal having for example a series of voltage or current levels, each level being proportional to a range of values of the ICS.

The ICS on line 26 is applied to a high-speed plotter generally designated as 30. U.S. Pat. Nos. 3,173,743, 3,349,407 and 3,465,295 describe plotters which can be adapted for use with this invention. Such plotters can be purchased, for example, from Geo Space Corporation, Houston, Texas. Only the main functions of one such plotter 30 will be described. A gating and comparator network 32 receives the ICS and provides an input (1) to a video amplifier 34, which controls the strength or intensity of the electron beam in a cathode-ray tube (CRT) 36 in synchronism with a sweep oscillator 38, and (2) to a vertical deflection amplifier 41. Oscillator 38 feeds a signal through a horizontal deflection amplifier 40 to a deflection coil 42 for horizontally deflecting the electron beam in the CRT 36. The output of amplifier 41 is applied to a pair of vertical plates 43 for vertically deflecting the electron beam in the CRT 36. The face of CRT 36 is divided into bands 44, 46 and 48. Each band is preferably made of a material which allows the emission of light of one of the primary colors when struck by the electron beam. The materials may be different phosphors which allow the emission of red, blue, or green light, as shown. A rotatably mounted recording drum 50 is positioned in front of CRT 36. Drum 50 carries on its surface a color sensitive recording medium such as a color film 52. A lens 54 which may be of a cylindrical collimating lens focuses the light from tube 36 into a single line of light on film 52. The light emanating from any phosphor band will pass through lens 54 and fall upon the same line on the recording film 52.

In operation of plotter 30, the sweep oscillator 38 is selected to have a relatively high-frequency sawtooth waveform to allow for a fast retrace of the linear sweep. In this manner the horizontal sweeping of the electron beam across the tube face can be accomplished in a relatively short time period.

Whenever the voltage level of the ICS falls within a predetermined amplitude range, gating network 32 will apply to video amplifier 34 a corresponding output voltage level. In this manner at each instant the amount of light output from tube 36 will depend on the existing voltage level of the ICS on line 26. Changes in the output light from CRT 36 will therefore depict a variable density recording on color film 52.

The gating and comparator network 32 also supplies input signals through three lines 62, 64 and 66, respectively labeled red, blue and green, to the vertical deflection amplifier 41. Hence, the vertical position of the electron beam in the CRT is dependent on which of lines 62–66 is energized. The vertical position of the electron beam in turn determines the output light color.

Consequently, both the intensity and color of the emitted light beam are controlled by the ICS. After completing the recording of one trace, the CRT 36 is moved along rail 37 in position to record the next trace. In this manner, the exposed film 52 will provide the desired SCD.

While the method of this invention has been described so far in relation to plotting a single intrinsic characteristic signal, such as velocity or attenuation, the digital computer 22 may provide on lines 26a, 26b . . . 26n intrinsic and extrinsic characteristic signals, previously described, any two or more of which may be simultaneously recorded on color film 52. Each signal may be associated with a particular color, the density or saturation of which is varied as a function of a parameter of the signal. In other words, in accordance with this invention, it is possible to depict in color one or more two-dimensional displays of one or more intrinsic properties of subterranean rocks. Also, one or more of the two-dimensional displays of intrinsic properties may be coextensive with a homologous display of an extrinsic property of such subterranean rocks.

Another system (not shown) which can be beneficially employed to make color ICS recordings is described in U.S. Pat. No. 3,134,849. This patent describes a system for "writing" on a paper placed upon a rotating drum. A color computer feeds three primary color signals. Each of the signals is employed to control a modulator which in turn controls the amplitude of an oscillator, the output oscillations of which are used to drive a separate electromechanical transducer for each color. Each transducer converts the electrical oscillations to mechanical oscillations which are used to shake or vibrate a specific nozzle-shaped container. A specific color pigment powder is fed into each container. The ends of the nozzles are brought together to effectively cover a unit area. The openings of the nozzles are positioned so that effectively the powder which is vibrated out through the nozzles by the vibration of the transducers becomes superimposed on the paper passing underneath the nozzles. Thus, the total powder output of the containers is determined by the amplitudes of the respective vibrations and hence by the amplitudes of the applied input signals.

It is also possible to record the separate characteristic signals on distinct transparent color sheets or films and to display the information content of such color sheets in register to produce a SCD. Thus to each ICS one primary color can be assigned. The superposition of the projected images on a screen creates a pattern of hues which can disclose correlations among the characteristic signal which would be otherwise difficult to grasp. In such a compositing process there is the freedom to select a permutation of three primary color filters, say red, yellow, and blue, to adjust the relative light intensities, and to purposefully mismatch the projections on the screen to obtain desired effects.

When a definite hue develops over an extended area on a SCD, it may indicate that the amplitude levels of the distinct signals vary concurrently over the area exhibiting the definite hue. In other words, specific combinations of the separate signals may be easily detected and established. On the other hand, to interpret homologous corresponding characteristics on independent displays is an extremely time-consuming task.

Another system which may be beneficially employed to carry out the preferred method of this invention is described in U.S. Pat. No. 3,107,137, assigned to the same assignee.

Figure 2:
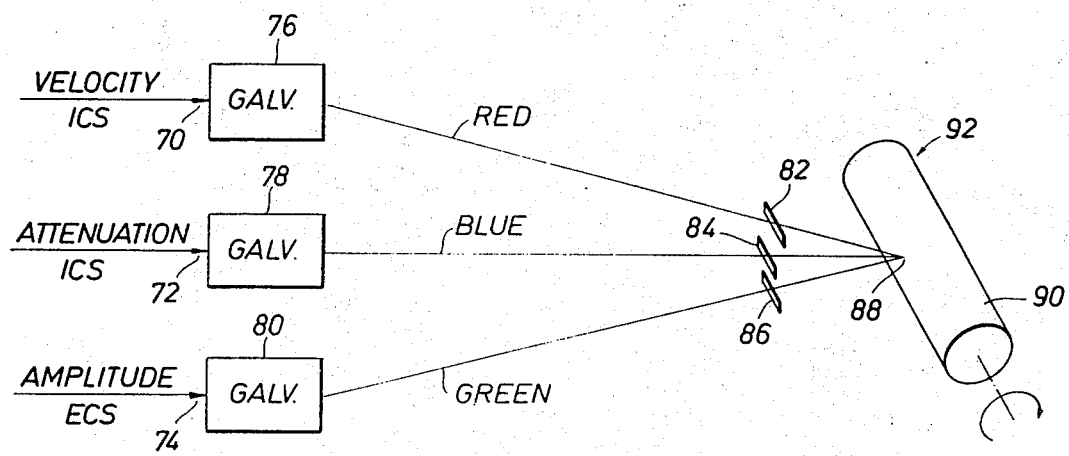
FIG. 2 is a showing of another apparatus for carrying out the method of this invention.

Referring now to FIG. 2, in one application the velocity and the attenuation ICS's are applied on input lines 70 and 72. The amplitude or extrinsic characteristic signal (ECS) is applied on input line 74. The input lines 70–74 feed, respectively, variable density galvanometric assemblies 76, 78 and 80 which emit, respectively, beams of red, blue and green light. Each of said galvanometric assemblies consists of the combination of optical elements designated by numbers 72, 32, 52, 54, 56 and 58 and forming Section D in FIG. 3 of U.S. Pat. No. 3,107,137. The intensity of each emitted light beam is dependent on the angular position of a galvanometric mirror (not shown) in each galvanometric section and hence on the amplitude level of the applied ICS or ECS.

Condensing lenses 82, 84 and 86 focus the red, blue and green light beams, respectively, onto a recording station 88 to form a combined light beam which is recorded on a color film or paper 90 which is attached to a rotatable drum 92.

Thus a variable density recording of each input signal will be made on the same trace and in a distinct color. In a manner described in U.S. Pat. No. 3,107,137 a plurality of laterally displaced, adjacent traces will be recorded on the recording medium 90 to form a SCD.

Figure 3:
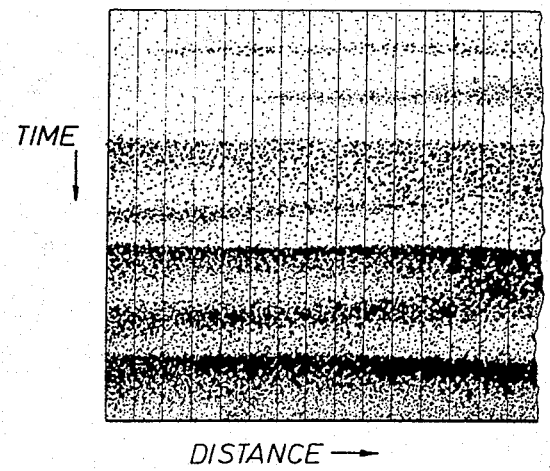
FIG. 3 shows a stacked characteristic display obtained by the method of this invention.

In FIG. 3 is shown an example of a variable density, multicolor display of one or more intrinsic characteristic signals which will be obtained with any of the recording systems above described. A trial-and-error approach will determine the manner of assignment of the different colors to the ICS's desired to be displayed in composite form. The SCD brings out distinct color contrasts. The commutation of the primary colors also influences the visual intelligibility. When red and green predominate as primary colors, thereby producing various shades of yellow, the texture of the display is clearly revealed. Also the predominance of blue and red as primary colors is effective. When, however, the predominant primary colors are green and blue the results are visually less differentiating. A trial-and-error approach will be useful in standardizing the interpretation of such multi-color SCD's.

Whereas the information content in a black-and-white representation yields only a single-valued function over two dimensions — the two dimensions defining position and the single-valued function measuring the gray level — the information content in a color representation yields the possibility of a multi-valued function over the same two dimensions.

In sum, the color SCD permits the simultaneous display of several intrinsic properties or parameters derived from seismic survey data or from other sources. Such combined displays will create unique colors. For example, if the intrinsic properties chosen to be displayed are acoustic velocity and acoustic attenuation, sandstone, shale, and limestone can be distinctively characterized. Sandstone and shale have relatively low acoustic velocity while the velocity of limestone is relatively high. On the other hand, the acoustic attenuation of shale is high while that of sandstone and limestone is low. Thus if low velocity is depicted on a SCD by yellow, high velocity by blue, and increasing attenuation by increasing intensity of red, limestone with high velocity and low attenuation will be represented by blue; sandstone with low velocity and low attenuation will be depicted as yellow; while shale with a low velocity and high attenuation will be characterized by an orange color.

In its ultimate form, the method of this invention will provide a printout from which an interpreter may determine both the shape of the subterranean formations traversed by the seismic waves and their physical properties and hence the geologic nature of the rocks themselves.

What I claim is:
1. A method of seismic exploration of the earth having a plurality of subterranean layers of rocks, each layer having intrinsic and extrinsic properties, the method including the steps of:
    selecting a first intrinsic property of said layers;
    determining a set of values of said first intrinsic property as a first function of horizontal and vertical dimensions of the earth;
    assigning a first color to said first intrinsic property;
    varying the intensity of said first color in accordance with said set of values; and
    displaying said set of values on a two-dimensional display wherein the intensity variations of said first color are disposed over the two dimensions of said display in accordance with said first function.
2. In the method of claim 1, selecting a second intrinsic property of said layers;
    determining a set of values of said second intrinsic property as a second function of horizontal and vertical dimensions of the earth;
    assigning a second color to said second intrinsic property;
    varying the intensity of said second color in accordance with said set of values and
    displaying said set of values on said two-dimensional display wherein the intensity variations of said second color are disposed over the tow dimensions of said display in accordance with said second function.
3. In the method of claim 2,
    selecting a third intrinsic property of said layers;
    determining a set of values of said third intrinsic property as a third function of horizontal and vertical dimensions of the earth;
    assigning a third color to said third intrinsic property;
    varying the intensity of said third color in accordance with said set of values; and
    displaying said set of values on said two-dimensional display wherein the intensity variations of said third color are disposed over the two dimensions of said display in accordance with said third function.
4. The method of claim 2 wherein,
    said first intrinsic property is acoustic velocity, and
    said second intrinsic property is acoustic attenuation.
5. In the method of claim 1,
    selecting an extrinsic property of said layers;
    determining the values of said extrinsic property as a function of horizontal and vertical dimensions of the earth; and
    displaying the values of said extrinsic property on said two-dimensional display whereby said values are disposed over the two dimensions of said display in accordance with said function.
6. The method of claim 5 wherein, said two-dimensional display of said extrinsic property is a reflection, seismic record section.
7. The method of claim 5 wherein, said extrinsic property is acoustic amplitude.
8. In the method of claim 1 wherein, said first intrinsic property is acoustic velocity.
9. The method of claim 1 wherein, said first intrinsic property is acoustic attenuation.
10. A record medium having two dimensions;
    said record medium displaying the variations in intensity of a first color representing a first intrinsic property of rock layers beneath the earth's surface;
    said intensity variations being determined in accordance with the variations in value of said first intrinsic property of said rock layers as a function of horizontal and vertical dimensions of the earth.
11. The record medium of claim 10, and further displaying the variations in intensity of a second color representing a second intrinsic property of rock layers beneath the earth's surface; and
    said intensity variations being determined in accordance with the variations in the values of said second intrinsic property of said rock layers as a function of horizontal and vertical dimensions of the earth.
12. The record medium of claim 11, and further displaying the variations in intensity of a third color representing a third intrinsic property of rock layers beneath the earth's surface; and
    said intensity variations being determined in accordance with the variations in the values of said third intrinsic property of said rock layers as a function of horizontal and vertical dimensions of the earth.
13. The record medium of claim 11 wherein,
    said first intrinsic property is acoustic velocity,
    said second intrinsic property is acoustic attenuation.
14. The record medium of claim 11 and further displaying a seismic record section of an extrinsic property of said rock layers.
15. The record medium of claim 14 wherein, said extrinsic property is seismic amplitude.
16. The record of claim 15 wherein, said first and second displays are coextensive with a homologous display of said seismic record section.
17. The record medium of claim 10, wherein said first intrinsic property is acoustic velocity.
18. The record medium of claim 10, wherein, said first intrinsic property is acoustic attenuation.
19. The record medium of claim 10 and further displaying a seismic record section of an extrinsic property of said rock layers.
20. The record medium of claim 19 wherein, said extrinsic property is seismic amplitude.
21. The record medium of claim 20 wherein said display of variations of said first color is co-extensive with a homologous display of said seismic record section.
22. The record medium of claim 19 wherein, said first intrinsic property is acoustic velocity.

23. The record medium of claim 19 wherein, said first intrinsic property is acoustic attenuation.

* * * * *